July 2, 1957  H. E. REESE ET AL  2,798,129
PRESSURE BALANCE INDICATOR
Filed June 29, 1953  2 Sheets-Sheet 1
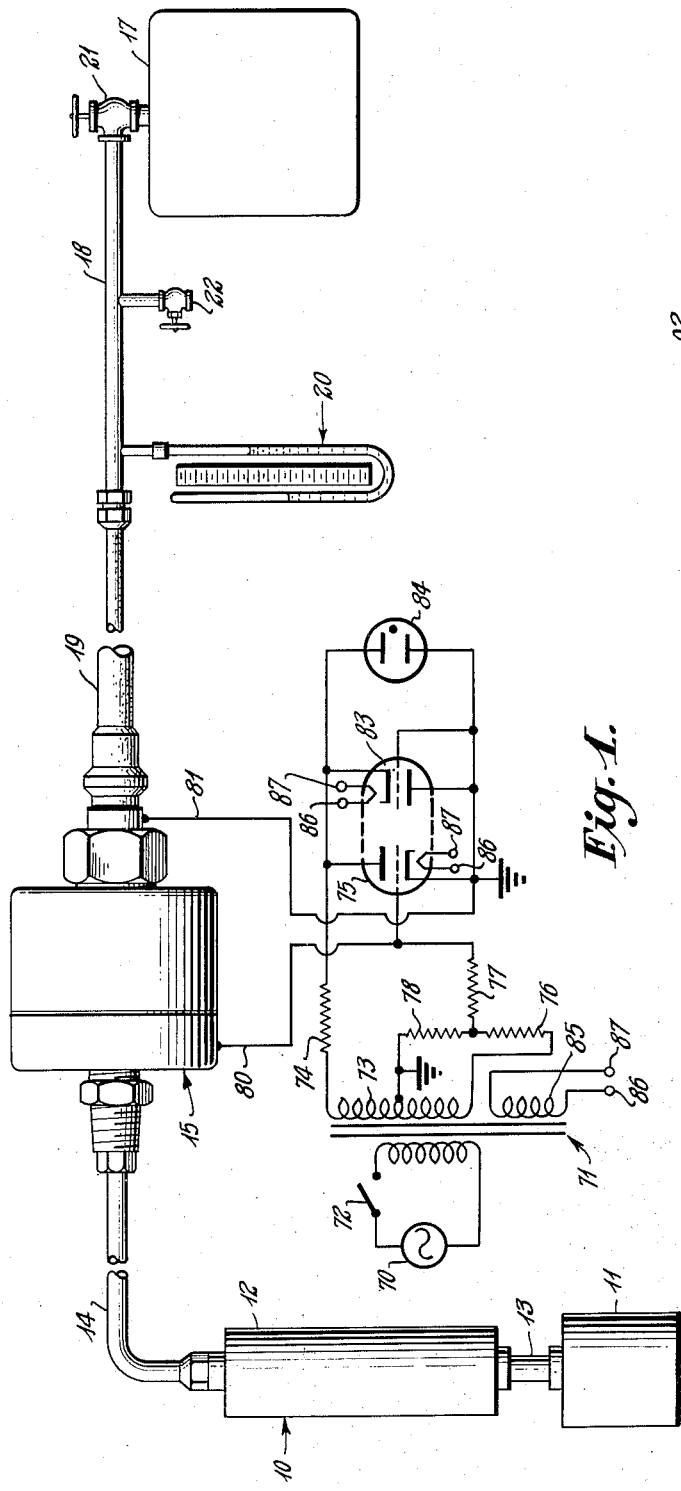
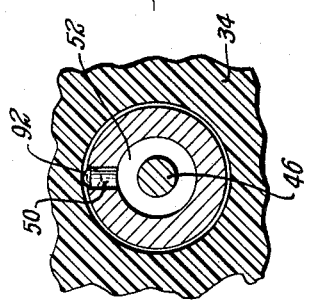
INVENTORS
H. E. Reese and
BY R. L. Posey
Hudson & Young
ATTORNEYS

United States Patent Office 2,798,129
Patented July 2, 1957

2,798,129

PRESSURE BALANCE INDICATOR

Herbert E. Reese and R. L. Posey, Bartlesville, Okla., assignors to Phillips Petroleum Company, a corporation of Delaware Application June 29, 1953, Serial No. 364,572

5 Claims. (Cl. 200—83)

This invention relates to pressure indicating means. In one specific aspect it relates to apparatus for measuring the vapor pressure of liquids.

The method generally employed heretofore to determine the vapor pressure of a liquid has consisted of placing a predetermined amount of liquid in a vessel which is in communication with a pressure gage for indicating the vapor pressure when the liquid in the vessel reaches equilibrium with its vapor. Such mechanism normally is maintained at a predetermined temperature such that comparisons between the vapor pressures of various liquids can readily be made. However, the conventional pressure gages which have been employed generally do not possess the degree of accuracy desired for the determinations of vapor pressure. To overcome this difficulty it has been proposed to note the reading on the pressure gage when the gage is connected to the region of vapor under measurement and then to remove the pressure gage and connect it to a source of variable pressure having a sensitive pressure measuring instrument such as a manometer connected thereto. The source of variable pressure is adjusted until the gage indicates the reading previously noted when the gage was connected to the source of vapor. The measured vapor pressure is then determined by noting the reading of the manometer when this correspondence is obtained. While this calibration procedure is capable of providing an accurate determination of vapor pressure it should readily be apparent that a number of errors are likely to occur in such a procedure, and, furthermore, this procedure does not afford direct readings.

It has been proposed to measure the vapor pressure of liquids by the use of pressure balance indicators. These indicators are based upon the principle of balancing the unknown vapor pressure against a second known pressure by means of a flexible diaphragm having the two pressures applied to opposite sides thereof. This balance is indicated by a predetermined flexure of the diaphragm and the value of the balance pressure is then read on a manometer scale. One of the chief difficulties encountered in the operation of these pressure balance indicators has been the calibration of the predetermined diaphragm flexure. The accuracy of the determination of course depends upon being able to measure the diaphragm deflection and to calibrate this deflection in terms of a predetermined pressure relationship. In accordance with the present invention there is provided an improved form of pressure balance indicator which utilizes a differential adjusting screw arrangement together with a pair of biasing springs to eliminate any backlash in the differential screw adjustment.

Accordingly, it is an object of this invention to provide improved apparatus for measuring vapor pressure by the pressure balance principle.

Another object is to provide a sensitive adjustment for establishing a predetermined spacing of electrical contact members associated with a flexible diaphragm.

A further object is to provide an improved indicating system for use with pressure balance indicators.

It is a further object to provide apparatus for carrying out the above-mentioned objects which is reliable in operation, of simplified construction, and which provides a high degree of sensitivity.

Various other objects, advantages and features of this invention should become apparent from the following detailed description taken in conjunction with the accompanying drawing in which:

Figure 1 is a front elevation view of the apparatus of this invention together with the associated indicating circuit;

Figure 3 is a sectional view taken along line 3—3 in Figure 2.

Figure 2:
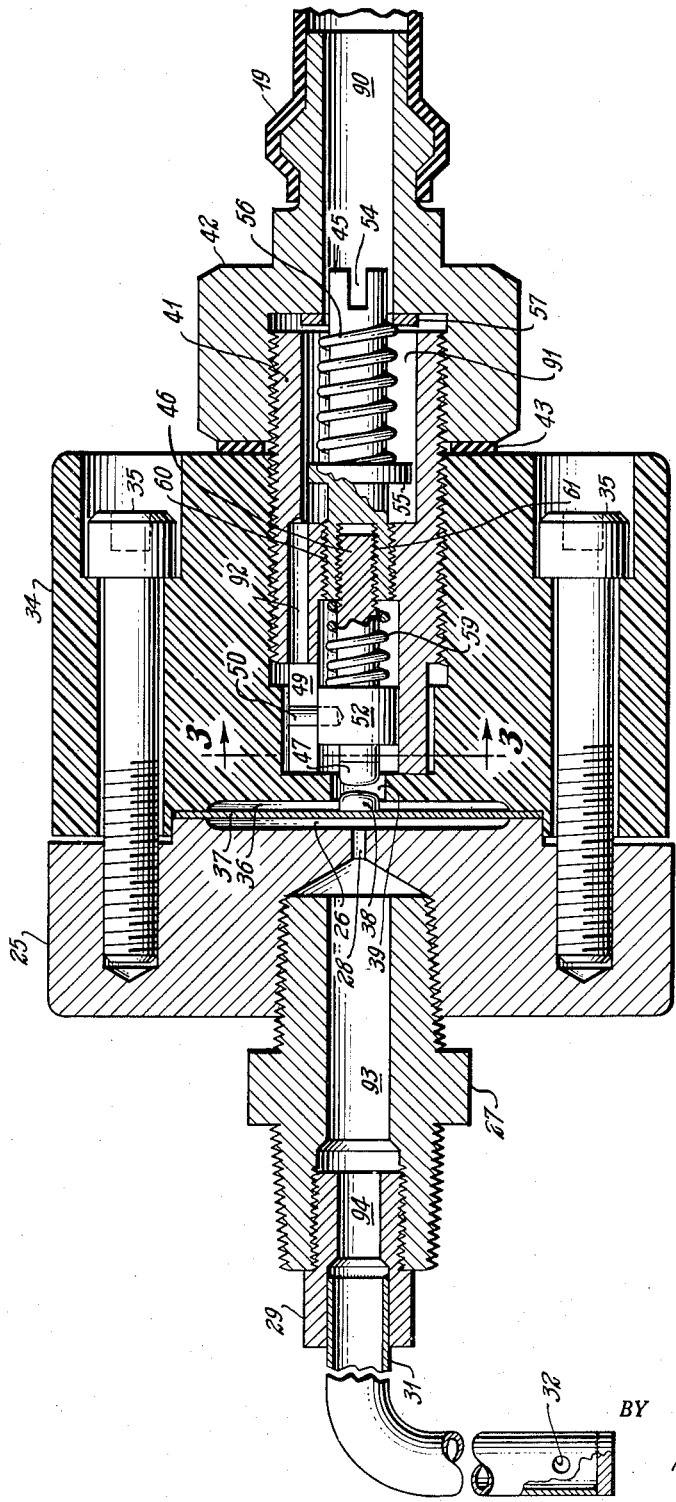
Figure 2 is a vertical sectional view of the pressure balance indicator illustrated in Figure 1.

Referring now to the drawing in detail and to Figure 1 in particular there is shown a conventional vessel 10 of the type generally used in making vapor pressure determinations. This vessel includes a liquid receptable 11 which communicates with a vapor chamber 12 through a connecting conduit 13. Receptacle 11 is filled to a predetermined level with a liquid whose vapor pressure is to be measured. This results in chamber 12 being filled with vapor from the liquid in receptacle 11, and the pressure in chamber 12 is indicative of the vapor pressure of liquid 11 at the temperature at which vessel 10 is maintained. Vessel 10 preferably is maintained at a constant temperature during the entire vapor pressure determination. A conventional pressure gage can be connected to region 12 if it is desired to have some direct indication of the pressure under consideration. This form of apparatus is designed such that receptacle 11 can readily be removed and immersed in the liquid to be tested so as to fill the receptacle to a predetermined level.

The upper end of vessel 10 is connected by a conduit 14 to a pressure balance device 15. A source of balance pressure is provided by a tank 17 which contains a gas at a pressure higher than the vapor pressure being measured. Tank 17 communicates with the opposite end of device 15 by a conduit 18 and a valve 21 is interposed therebetween to regulate the pressure admitted to conduit 18 from tank 17. A flexible conduit 19 is attached to the other end of conduit 18 to facilitate coupling of conduit 18 to pressure balance device 15. A manometer pressure gage 20 is provided in communication with conduit 18 to indicate the pressure therein, and an exhaust valve 22 also is provided in communication with conduit 18. In operation the pressure within conduit 18 is adjusted by valves 21 and 22 until it is equal to the vapor pressure of the liquid to be tested or until a predetermined relation exists between these two pressures as indicated by the electrical circuit associated with device 15. When these two pressures are balanced the pressure in conduit 18 is read on manometer 20, and this in turn provides an indication of the vapor pressure in region 12. In this manner a much higher degree of accuracy is obtained than is possible by the use of conventional pressure gages connected directly to region 12 and, furthermore, it is not necessary to remove the pressure gage from the test unit for subsequent calibration against a manometer gage each time a vapor pressure determination is made.

Pressure balance device 15 is illustrated in detail in Figures 2 and 3. This device comprises an annular plate 25 having an annular cavity 26 formed in one face thereof. A hollow connector 27 is threaded into plate 25 whereby a passage 28 in plate 25 communicates between the interior of connector 27 and cavity 26. A connecting nut 29 is threaded in connector 27 and a hollow tube 31 which is fitted in nut 29. Tube 31 extends into region 12 and is provided with a small opening 32 near the lower end thereof which allows the gas pressure in region 12 to be transmitted through tube 31, nut 29, connector 27 and passage 28 to a cavity 26 of plate 25.

An annular casing 34 of electrically insulating material is held in assembled position adjacent plate 25 by a plurality of screws 35. Casing 34 is provided with an annular cavity 36 which opposes cavity 26 of plate 25 and is separated therefrom by a flexible diaphragm 37 which is interposed between plate 25 and casing 34. A first electrical contact button 38 is attached at the center of diaphragm 37 and extends through cavity 36 into a passage 39 in casing 34. A sleeve member 41 is threaded in casing 34 and a hose connector 42 is in turn threaded to sleeve member 41 with a gasket 43 being interposed between connector 42 and casing 34. Flexible conduit 19 is fitted about the end of connector 42. An adjusting screw 45 is threaded into the interior of sleeve member 41 and a contact screw 46 is in turn threaded into the interior of adjusting screw 45. A second electrical contact button 47 is attached to the end of contact screw 46 so as to be in closely spaced relation with contact button 38. A longitudinal slot 49 is formed in sleeve member 41 and a pin 50 is attached to a flanged portion 52 of contact screw 46 for movement in slot 49. Pin 50 thereby prevents rotation of contact screw 46 with respect to stationary sleeve member 41. Adjusting screw 45 is provided with a slot 54 at its outer end and with an integral flange 55 near the midpoint thereof. A first coil spring 56 extends between flange 55 and a washer 57, the latter surrounding adjusting screw 45 and abutting hose connector 42. A second coil spring 59 is interposed between flange 52 and the inner end of adjusting screw 45.

The threaded region 60 of adjusting screw 45 and the threaded region 61 of contact screw 46 are unequal in the number of threads per inch. In one particular embodiment of this invention, region 60 of adjusting screw 45 has thirty-two threads per inch and 61 of contact screw 46 has forty threads per inch. This provides a differential screw arrangement such that longitudinal movement of adjusting screw 45 through a predetermined distance results in corresponding movement of contact screw 46 through one-fifth of this predetermined distance. If adjusting screw 45 is turned so as to move inwardly toward diaphragm 37 the contact screw 46 moves outwardly by one-fifth this amount and, conversely, if adjusting screw 45 is rotated so as to move outwardly the contact screw 46 moves inwardly. Coil springs 56 and 59 function to retain screws 45 and 46 in tight engagement at all times. This eliminates any backlash in the assembly such that rotation of adjusting screw 45 results in instantaneous movement of contact screw 46. This feature greatly facilitates accurate adjustment of the position of contact button 47 with respect to contact button 38. The differential thread arrangement allows a close adjustment to be made.

When diaphragm 37 is flexed a predetermined amount contact button 38 engages contact button 47. This in turn completes an electrical circuit between plate 25 and connector 42 through diaphragm 37, contact buttons 38 and 47 and the adjusting screw assembly. The indicating circuit associated with this pressure balance device is illustrated schematically in Figure 1. A source of alternating potential 70 is applied across the primary winding of a transformer 71 through a switch 72. One end terminal of a first secondary winding 73 of transformer 71 is connected through a resistor 74 to the anode of a vacuum tube triode 75. The second end terminal of transformer winding 73 is connected to the control grid of tube 75 through series connected resistors 76 and 77. The center tap of transformer 73 is maintained at ground potential and the junction between series resistors 76 and 77 is connected to ground through a resistor 78. A lead 80 connects the control grid of tube 75 to plate 25 which is in electrical contact with button 38 through metallic diaphragm 37. A lead 81 connects the grounded cathode of tube 75 to connector 42 which in turn is in electrical contact with button 47 through the adjusting screw assembly. The anode of tube 75 is connected to the cathode of a second vacuum tube triode 83 and the cathode of tube 75 is connected to the anode of tube 83. The control grid of tube 83 is connected directly to the anode of said tube, which in effect converts triode 83 into a diode. It should be evident that a diode could be employed in place of triode 83, although for economy of construction a single double triode tube has been employed. A neon flasher tube 84 is connected in parallel with tube 83. A second secondary winding 85 is connected on transformer 71. The end terminals 86 and 87 of winding are connected to the filaments of tubes 75 and 87.

With reference to Figure 2 it will be apparent that the fluid in conduit 18 is admitted into cavity 36 adjacent diaphragm 37 through a passage 90 in connector 42, a second passage 91 in sleeve member 41, a third passage 92 which is drilled through sleeve member 41, through slot 49 and finally through passage 39. Cavity 26 which is adjacent the opposite side of diaphragm 37 is connected to pressure vessel 10 through passage 28, a passage 93 in connector 27, a passage 94 in nut 29 and through the interior of tube 31. In operation, contact button 47 initially is positioned so as to engage contact button 38. This position is established with the pressure in conduit 18 being less than the pressure in vessel 10. Thereupon, the pressure in conduit 18 gradually is increased by opening valve 21 until electrical contact between buttons 47 and 38 is broken, thereby indicating that the two pressures are balanced. Exhaust valve 22 is provided to reduce the pressure in conduit 18 between subsequent measurement and to obtain a more accurate adjustment near the balance point if necessary. At the condition of balance between the vapor pressure in vessel 10 and the pressure in conduit 18 the magnitude of this latter pressure is read on manometer 20 as previously indicated.

The point of balance between the pressures in conduits 14 and 18 is indicated by the associated electrical circuit. As long as the pressure in conduit 14 exceeds the pressure in conduit 18 button 38 remains in contact with button 47. This serves to complete an electrical connection between leads 80 and 81, which grounds the control grid of tube 75. During the first half cycle of applied voltage when the potential on the anode of tube 75 is above a predetermined positive value with respect to ground, tube 75 is conductive. During this first half cycle tube 83 is non-conductive because the anode thereof is maintained at ground potential while the cathode is at a positive value. During the second half cycle of applied voltage, tube 75 is non-conductive because the anode thereof is maintained at a negative value. However, tube 83 becomes conductive during a portion of this second half cycle when the potential at the cathode thereof exceeds a predetermined negative value with respect to the grounded anode. Neon flasher 84 becomes conductive only when a predetermined potential is applied thereacross. Because tube 75 is conductive during a portion of the first half cycle of applied voltage and tube 83 is conductive during a portion of the second half cycle, the potential needed to fire tube 84 is not reached due to the resulting potential drop across resistor 74.

Once the pressure in conduit 18 rises to a sufficient value to overcome the pressure in conduit 14, the electrical connection between buttons 38 and 47 is broken thereby removing the ground connection from the control grid of tube 75. Accordingly, during the first half cycle of applied voltage when the anode of tube 75 becomes positive the control grid of tube 75 is maintained at a negative value which prevents current from passing through tube 75. As a result there is no potential drop across resistor 74 so that the potential across neon flasher 84 is sufficient to cause firing thereof to provide a visual indication that the pressure in conduit 18 is sufficient to cause disengagement of contact buttons 38 and 47. During the second half cycle of applied voltage tube 75 is non-conductive as previously indicated, but tube 83 is conductive when the potential on the cathode thereof reaches a predetermined negative value. This conduction by tube 83 reduces the potential across tube 84 to extinguish the current flow through tube 84. Thus, when electrical contact is broken between buttons 38 and 47, tube 84 flashes at a frequency equal to the frequency of voltage source 70.

In one particular embodiment of this invention excellent results were obtained with the following circuit component values: resistor 74, 5 megohms; resistor 78, 10,000 ohms; resistor 76, 330,000 ohms; resistor 77, 7 megohms; triodes 75 and 83 were contained in a tube type 2C51; and tube 84 was type 2D21.

The pressure balance indicator constructed in accordance with the present invention has been found to be very reliable in operation and extremely sensitive. The apparatus is convenient to use because it is not necessary to disconnect a pressure gage from vessel 10 each time a measurement is made. Adjustment of the spacing between contact buttons 38 and 47 is readily accomplished in a positive manner by rotation of adjusting screw 45. It should be noted that hose connector 42 extends outwardly beyond adjusting screw 45 and thereby prevents accidental movement of this adjusting screw. Changes in adjustment can readily be made by disconnecting flexible hose 19 from connector 42.

While this invention has been described in conjunction with a present preferred embodiment thereof it is to be understood that this description is illustrative only and not intended to limit the invention.

What is claimed is:

1. A pressure balance indicator comprising, in combination, a plate having a first cavity in one face thereof and a first passage therethrough which communicates with said first cavity, a casing having a second cavity in one end thereof and a longitudinal second passage therethrough which communicates with said second cavity, said plate and said casing secured in assembled relation whereby said first and second cavities oppose one another, a flexible diaphragm interposed between said cavities and substantially perpendicular to said second passage, a sleeve member within said second passage, a portion of said sleeve member being provided with internal threads, an adjusting member having external threads meshing with the internal threads of said sleeve, the end of said adjusting member adjacent said diaphragm being provided with an internally threaded passage, a contact member having external threads on one end thereof meshing with the internal threads of said adjusting member, the second end of said contact member extending into closely spaced relation with said diaphragm, means to prevent rotation of said contact member with respect to said sleeve member, the external and internal threaded portions of said adjusting member having different numbers of threads per unit length, whereby rotation of said adjusting member in a first direction in said casing moves said adjusting member longitudinally of said second passage a first distance in one direction, said rotation of said adjusting member causing said contact member to move longitudinally of said second passage a second distance less than said first distance and in a direction opposite said one direction, a first spring urging said contact member away from said adjusting member longitudinally of said second passage, and a second spring urging said adjusting member toward said sleeve member longitudinally of said second passage, said first and second springs thereby eliminating lost motion between the threaded portions of said sleeve member, said contact member, and said adjusting member.

2. A pressure balance indicator comprising, in combination a metallic plate having a first cavity in one face thereof and a first passage therethrough which communicates with said first cavity, a casing of electrically insulating material having a second cavity in one end thereof and a second passage longitudinally therethrough which communicates with said second cavity, said plate and said casing secured in assembled relation whereby said first and second cavities oppose one another, a flexible metallic diaphragm interposed between said first and second cavities substantially perpendicular to said second passage, a metallic sleeve member within said second passage, said sleeve member having a longitudinal slot therein, a portion of said sleeve being provided with internal threads, a metallic adjusting member having external threads meshing with the internal threads of said sleeve, the end of said adjusting member adjacent said diaphragm being provided with an internally threaded passage, a contact member having external threads on one end thereof meshing with the internal threads of said adjusting member, the second end of said contact member extending into closely spaced relation with said diaphragm, a pin extending from said contact member to engage the longitudinal slot in said sleeve member to prevent rotation of said contact member relative to said sleeve member, the external and internal threaded portions of said adjusting member having different numbers of threads per unit length, whereby rotation of said adjusting member in a first direction in said casing moves said adjusting member longitudinally of said second passage a first distance in one direction, said rotation of said adjusting member causing said contact member to move longitudinally of said second passage a second distance less than said first distance and in a direction opposite said one direction, a first spring urging said contact member away from said adjusting member longitudinally of said second passage, and a second spring urging said adjusting member toward said sleeve member longitudinally of said second passage, said first and second springs thereby eliminating lost motion between the threaded portions of said sleeve member, said contact member and said adjusting member.

3. An adjustable pressure switch comprising, in combination, a housing having a cavity therein divided into first and second chambers by a flexible member, a first passage in said housing communicating with said first chamber and a first source of pressure exterior of said housing, a second passage in said housing communicating with said second cavity and a second source of pressure exterior of said housing, a portion of said housing defining said second passage being provided with first internal threads, an adjusting member having external threads meshing with said first internal threads, the end of said adjusting member adjacent said flexible member being provided with an internally threaded third passage, a contact member having external threads on one end thereof meshing with the internal threads of said adjusting member, the second end of said contact member extending into closely spaced relation with said flexible member, and means to prevent rotation of said contact member with respect to said housing, the external and internal threaded portions of said adjusting member having different numbers of threads per unit length, whereby rotation of said adjusting member in a first direction in said housing moves said adjusting member longitudinally of said second passage a first distance in one direction, said rotation of said adjusting member causing said contact member to move longitudinally of said second passage a second distance less than said first distance and in a direction opposite said one direction.

4. A pressure balance indicator comprising, in combination, a metallic plate having a first cavity in one face thereof, a first passage in said plate communicating with said first cavity, a casing of electrically insulating material having a second cavity in one end thereof and a second passage longitudinally therethrough, said plate and said casing secured in assembled relation whereby said first and second cavities oppose one another, said second passage communicating with said second cavity through an opening in said casing, a flexible metallic diaphragm interposed between said first and second cavities substantially perpendicular to said opening, a metallic sleeve member within said second passage, said sleeve member having an inner enlarged annular portion and a third internally threaded longitudinal passage therethrough, said sleeve having a fourth longitudinal passage which communicates on both sides of said enlarged annular portion with said second passage, a metallic adjusting member having external threads meshing with the threads of said third passage, the end of said adjusting member adjacent said opening being provided with an internally threaded fifth passage, a contact member having exterior threads on one end thereof meshing with the internal threads of said adjusting member, the second end of said contact member having a first contact button which can extend through said opening into closely spaced relation with said diaphragm, and a pin extending from said contact member into a longitudinal slot in said sleeve member to prevent rotation of said contact member relative to said sleeve member, the external and internal threaded portions of said adjusting member having different numbers of threads per unit length, whereby rotation of said adjusted member in a first direction in said casing moves said adjusting member longitudinally of said second passage a first distance in one direction, said rotation of said adjusting member causing said contact member to move longitudinally of said second passage a second distance less than said first distance and in a direction opposite said one direction, said diaphragm having a second contact button secured thereto and movable within said second cavity and said opening whereby flexure of said diaphragm causes engagement of said first and second contact buttons.

5. Apparatus according to claim 4 wherein a first spring surrounds said contact member urging the same away from said adjusting member longitudinally of said second passage, and a second spring surrounds said adjusting member and urges the same toward said sleeve member longitudinally of said second passage.

References Cited in the file of this patent

UNITED STATES PATENTS

| | | |
|---|---|---|
| 2,295,217 | Judge et al. | Sept. 8, 1942 |
| 2,382,547 | De Juhasz | Aug. 14, 1945 |
| 2,497,025 | Clason | Feb. 7, 1950 |
| 2,511,509 | McGuire | June 13, 1950 |
| 2,596,152 | Johnson | May 13, 1952 |
| 2,645,128 | Walker et al. | July 14, 1953 |
| 2,645,949 | De Boisblanc | July 21, 1953 |
| 2,652,727 | Richardson et al. | Sept. 22, 1953 |

FOREIGN PATENTS

| | | |
|---|---|---|
| 745,894 | Germany | May 30, 1944 |